(12) United States Patent
Kristiansen et al.

(10) Patent No.: US 11,401,399 B2
(45) Date of Patent: Aug. 2, 2022

(54) POLYMER COMPOSITIONS OF IMPROVED SCRATCH RESISTANCE, IMPROVED MECHANICAL STABILITY AND IMPROVED HAZE

(75) Inventors: Per Magnus Kristiansen, Zurich (CH); Daniel Müller, Basel (CH); Michèle Gerster, Binningen (CH)

(73) Assignee: BASF SE, Ludwigshafen (DE)

( * ) Notice: Subject to any disclaimer, the term of this patent is extended or adjusted under 35 U.S.C. 154(b) by 424 days.

(21) Appl. No.: 13/496,207

(22) PCT Filed: Sep. 7, 2010

(86) PCT No.: PCT/EP2010/063092
§ 371 (c)(1),
(2), (4) Date: Apr. 12, 2012

(87) PCT Pub. No.: WO2011/032861
PCT Pub. Date: Mar. 24, 2011

(65) Prior Publication Data
US 2012/0190797 A1    Jul. 26, 2012

(30) Foreign Application Priority Data

Sep. 18, 2009 (EP) .................................. 09170639

(51) Int. Cl.
| | | |
|---|---|---|
| C08K 3/00 | (2018.01) | |
| C08F 210/16 | (2006.01) | |
| C08F 110/06 | (2006.01) | |
| C08K 5/20 | (2006.01) | |
| C08K 5/098 | (2006.01) | |
| C08K 5/1575 | (2006.01) | |
| C08K 5/52 | (2006.01) | |
| C08K 5/00 | (2006.01) | |

(52) U.S. Cl.
CPC ............... C08K 5/20 (2013.01); C08K 5/098 (2013.01); C08K 5/1575 (2013.01); C08K 5/52 (2013.01); C08K 5/0083 (2013.01)

(58) Field of Classification Search
CPC ... C08K 5/16; C08K 5/17; C08K 5/20; C08K 5/49; C07C 211/43
USPC .......................... 524/227, 228, 226, 340, 191
See application file for complete search history.

(56) References Cited

U.S. PATENT DOCUMENTS

| | | | |
|---|---|---|---|
| 4,684,683 A | 8/1987 | Schmidt | |
| 2004/0063830 A1* | 4/2004 | Schmidt | .................. C08L 23/10 |
| | | | 524/191 |
| 2007/0149663 A1* | 6/2007 | Schmidt | .................. C08K 5/20 |
| | | | 524/227 |

FOREIGN PATENT DOCUMENTS

| | | |
|---|---|---|
| EP | 0213788 A2 | 3/1987 |
| EP | 2837654 * | 5/2013 |
| JP | 62257951 A | 11/1987 |
| JP | 7-278374 | 10/1995 |
| JP | 9012805 A | 1/1997 |
| JP | 2008-50617 | 3/2008 |
| KR | 20030050324 A | 6/2003 |
| WO | 9321269 A1 | 10/1993 |
| WO | 02/46300 | 6/2002 |
| WO | 2004/072168 A2 | 8/2004 |

OTHER PUBLICATIONS

English language abstract of KR 20030050324 Jun. 2003.
English language abstract of JP 9012805 Jan. 1997.
English language abstract of JP 62257951 Nov. 1987.
Japanese Decision to Grant dated Mar. 30, 2015 in connection with corresponding Japanese Application No. 2012-529210., filed Sep. 7, 2010.

* cited by examiner

Primary Examiner — Deve V Hall
(74) Attorney, Agent, or Firm — Grüneberg and Myers PLLC

(57) ABSTRACT

The present invention provides a composition comprising (i) a polymer, (ii) an organic compound A carrying at least two amide functionalities, and (iii) 12 to 1'000 parts per million (ppm) of a compound B selected from the group consisting of an organic compound C carrying at least two amide functionalities, sugar alcohol acetals and derivatives thereof, metal salts of organic acids and precursor-systems thereof, metal salts of organic phosphoric acids and precursor-systems thereof and metal salts of polyols and precursor-systems thereof, and mixtures thereof, based on the weight of the polymer, as well as shaped articles obtainable from this composition.

11 Claims, No Drawings

POLYMER COMPOSITIONS OF IMPROVED SCRATCH RESISTANCE, IMPROVED MECHANICAL STABILITY AND IMPROVED HAZE

The present invention relates to compositions comprising a polymer, an organic compound A carrying at least two amide functionalities and a compound B, to shaped articles obtainable from these compositions, and to the use of a mixture of an organic compound A carrying at least two amide functionalities and a compound B for improving the mechanical properties, respectively, the scratch resistance of a polymer.

WO 04/072168 describes compositions comprising a polymer and at least one compound carrying three amide functionalities.

It was an object of the present invention to provide polymer compositions showing improved mechanical properties, in particular an improved flexural (elastic) modulus, and at the same time improved haze and improved scratch resistance.

It was another object of the present invention to provide polymer compositions showing an improved scratch resistance.

These objects are solved by the composition, the shaped article and the uses as described throughout the specification.

The composition of the present invention comprises
(i) a polymer,
(ii) an organic compound A carrying at least two amide functionalities, and
(iii) 12 to 1'000 parts per million (ppm) of a compound B selected from the group consisting of organic compounds C carrying at least two amide functionalities, sugar alcohol acetals and derivatives thereof, metal salts of organic acids and a precursor-systems thereof, metal salts of organic phosphoric acids and precursor-systems thereof, metal salts of polyols and precursor-systems thereof, and mixtures thereof, based on the weight of the polymer.

The organic compound A carrying at least two amide functionalities can be a compound of formula

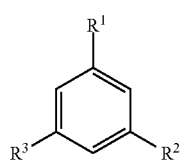

(1)

wherein
$R^1$ is —NHC(O)$R^4$ or —C(O)NH$R^5$
$R^2$ is —NHC(O)$R^6$ or —C(O)NH$R^7$, and
$R^3$ is —NHC(O)$R^8$ or —C(O)NH$R^9$, wherein $R^4$, $R^5$, $R^6$, $R^7$, $R^8$ and $R^9$ can be the same or different and are $C_{1-20}$-alkyl; $C_{2-20}$-alkenyl unsubstituted or substituted by one or more hydroxy; $C_{2-20}$-alkyl interrupted by oxygen or sulfur; $C_{3-12}$-cycloalkyl unsubstituted or substituted by one or more $C_{1-20}$-alkyl; $(C_{3-12}$-cycloalkyl)-$C_{1-10}$-alkyl unsubstituted or substituted by one or more $C_{1-20}$-alkyl; bis[$C_{3-12}$-cycloalkyl]-$C_{1-10}$-alkyl unsubstituted or substituted by one or more $C_{1-20}$-alkyl; a bicyclic or tricyclic hydrocarbon radical with 5 to 20 carbon atoms unsubstituted or substituted by one or more $C_{1-20}$-alkyl; phenyl unsubstituted or substituted by one or more radicals selected from $C_{1-20}$-alkyl, $C_{1-20}$-alkoxy, $C_{1-20}$-alkylamino, di($C_{1-20}$-alkyl) amino, hydroxy and nitro; phenyl-$C_{1-20}$-alkyl unsubstituted or substituted by one or more radicals selected from $C_{1-20}$-alkyl, $C_{1-12}$-cycloalkyl, phenyl, $C_{1-20}$-alkoxy and hydroxy; phenylethenyl unsubstituted or substituted by one or more $C_{1-20}$-alkyl; bi-phenyl-($C_{1-10}$-alkyl) unsubstituted or substituted by one or more $C_{1-20}$-alkyl; naphthyl unsubstituted or substituted by one or more $C_{1-20}$-alkyl; naphthyl-$C_{1-20}$-alkyl unsubstituted or substituted by one or more $C_{1-20}$-alkyl; naphthoxymethyl unsubstituted or substituted by one or more $C_{1-20}$-alkyl; biphenylenyl, flourenyl, anthryl; a 5- to 6-membered heterocyclic radical unsubstituted or substituted by one or more $C_{1-20}$-alkyl; a $C_{1-20}$-hydrocarbon radical containing one or more halogen; or tri($C_{1-10}$-alkyl)-silyl($C_{1-10}$-alkyl).

Examples of $C_{1-20}$-alkyl are ethyl, n-propyl, 1-methylethyl, n-butyl, 2-methylpropyl, 1-methylpropyl, tert-butyl, pentyl, 1-methylbutyl, 2-methylbutyl, 3-methylbutyl, 1,1-dimethylpropyl, 1-ethylpropyl, tert-butylmethyl, hexyl, 1-methylpentyl, heptyl, isoheptyl, 1-ethylhexyl, 2-ethylpentyl, 1-propylbutyl, octyl, nonyl, isononyl, neononyl, 2,4,4-trimethylpentyl, undecyl, tridecyl, pentadecyl and heptadecyl.

Examples of $C_{2-20}$-alkenyl unsubstituted or substituted by one or more hydroxy, e.g. 1, 2 or 3 hydroxy, are 9-decenyl, 8-heptadecenyl and 11-hydroxy-8-heptadecenyl.

Examples of $C_{2-20}$-alkyl interrupted by oxygen are tert-butoxymethyl, tert-butoxyethyl, tert-butoxypropyl and tert-butoxybutyl.

Examples of $C_{2-20}$-alkyl interrupted by sulfur are $(H_3C)_3C$—S—$CH_2$—, $(H_3C)_3C$—S—$C_2H_4$—, $(H_3C)_3C$—S—$C_3H_6$— and $(H_3C)_3C$—S—$C_4H_8$—.

Examples of $C_{3-12}$-cycloalkyl unsubstituted or substituted by one or more $C_{1-20}$-alkyl, e.g. 1, 2, 3 or 4$C_{1-4}$-alkyl, are cyclopropyl, 3-methylcyclopropyl, 2,2,3,3-tetramethyl-cyclopropyl, cyclobutyl, cyclopentyl, cyclohexyl, 1-methylcyclohexyl, 2-methyl-cyclohexyl, 3-methylcyclohexyl, 4-methylcyclohexyl, 4-tert-butylcyclohexyl and cycloheptyl.

Examples of $(C_{3-12}$-cycloalkyl)-$C_{1-10}$-alkyl unsubstituted or substituted by one or more $C_{1-20}$-alkyl, e.g. 1, 2 or 3$C_{1-4}$-alkyl, are cyclopentylmethyl, 2-cyclopentylethyl, cyclohexylmethyl, 2-cycohexylethyl, 3-cyclohexylpropyl, 4-cyclohexylbutyl and (4-methyl-cyclohexyl)methyl.

An example of bis[$C_{3-12}$-cycloalkyl]-$C_{1-10}$-alkyl unsubstituted or substituted by one or more $C_{1-20}$-alkyl, e.g. 1, 2 or 3$C_{1-4}$-alkyl, is dicyclohexylmethyl.

Examples of a bicyclic or tricyclic hydrocarbon radical with 5 to 20 carbon atoms unsubstituted or substituted by one or more $C_{1-20}$-alkyl, e.g. 1, 2 or 3$C_{1-4}$-alkyl, are

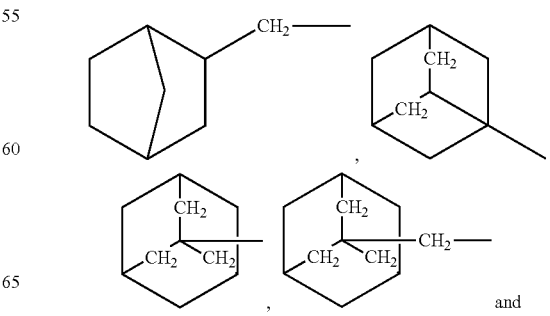

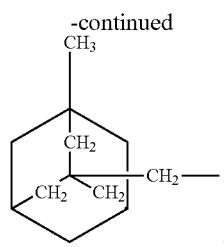

Examples of phenyl unsubstituted or substituted by one or more radicals, e.g. 1, 2 or 3 radicals, selected from $C_{1-20}$-alkyl, $C_{1-20}$-alkoxy, $C_{1-20}$-alkylamino, di($C_{1-20}$-alkyl)amino, hydroxy and nitro, preferably $C_{1-4}$-alkyl, $C_{1-4}$-alkoxy, $C_{1-4}$-alkylamino, di($C_{1-4}$-alkyl)amino, hydroxy and nitro, are phenyl, 3-methylphenyl, 3-methoxyphenyl, 4-methylphenyl, 4-ethylphenyl, 4-propylphenyl, 4-isopropylphenyl, 4-tert-butylphenyl, 4-isopropoxyphenyl, 2,3-dimethoxyphenyl, 2-nitrophenyl, 3-methyl-6-nitrophenyl, 4-dimethylaminophenyl, 2,3-dimethylphenyl, 2,6-dimethylphenyl, 2,4-dimethylphenyl, 3,4-dimethylphenyl, 3,5-dimethylphenyl, 3,5-di-tert-butylphenyl, 2,4,6-trimethylphenyl and 3,5-di-tert-butyl-4-hydroxyphenyl.

Examples of phenyl-$C_{1-20}$-alkyl unsubstituted or substituted by one or more radicals, e.g. 1, 2 or 3 radicals, selected from $C_{1-20}$-alkyl, $C_{3-12}$-cycloalkyl, phenyl, $C_{1-20}$-alkoxy and hydroxy, preferably $C_{1-4}$-alkyl, $C_{3-6}$-cycloalkyl, phenyl, $C_{1-4}$-alkoxy and hydroxy, are benzyl, α-cyclohexylbenzyl, diphenylmethyl, 1-phenylethyl, α-hydroxybenzyl, 2-phenylethyl, 2-phenylpropyl, 3-phenylpropyl, 3-methylbenzyl, 3,4-dimethoxybenzyl and 2-(3,4-dimethoxyphenyl)ethyl.

An example of phenylethenyl unsubstituted or substituted by one or more $C_{1-20}$-alkyl, e.g. 1, 2 or 3 $C_{1-4}$-alkyl, is 2-(4-methylphenyl)ethenyl.

An example of biphenyl-($C_{1-10}$-alkyl) unsubstituted or substituted by one or more $C_{1-20}$-alkyl, e.g. 1, 2 or 3 $C_{1-4}$-alkyl, is 4-biphenylmethyl.

Examples of naphthyl unsubstituted or substituted by one or more $C_{1-20}$-alkyl, e.g. 1, 2 or 3 $C_{1-4}$-alkyl, are 1-naphthyl and 2-naphthyl.

Examples of naphthyl-$C_{1-20}$-alkyl unsubstituted or substituted by one or more $C_{1-20}$-alkyl, e.g. 1, 2 or 3 $C_{1-4}$-alkyl, are 1-naphthylmethyl and 2-naphthylmethyl.

An example of naphthoxymethyl unsubstituted or substituted by one or more $C_{1-20}$-alkyl, e.g. 1, 2 or 3 $C_{1-4}$-alkyl, is 1-naphthoxymethyl.

An example of biphenylenyl, fluorenyl or anthryl is 2-biphenylenyl, 9-fluorenyl, 1-fluorenyl or 9-anthryl, respectively.

Examples of a 5- to 6-membered heterocyclic radical unsubstituted or substituted by one or more $C_{1-20}$-alkyl, e.g. 1, 2 or 3 $C_{1-4}$-alkyl, are 3-pyridinyl, 4-pyridinyl, 2-hydroxypyridin-3-yl, 3-quinolinyl, 4-quinolinyl, 2-furyl, 3-furyl and 1-methyl-2-pyrryl.

Examples of a $C_{1-20}$-hydrocarbon radical containing one or more halogen, e.g. 1, 2, 3, 4, 5, or 6-F, —Cl or -J, are 1-bromo-2-methylpropyl, dichloromethyl, pentafluoroethyl, 3,5-bis[trifluoromethyl]phenyl, 2,3,5,6-tetrafluoro-p-tolyl, 2,3-dichlorophenyl, 3,4-dichlorophenyl and 2,4-bis[trifluoromethyl]phenyl.

In preferred compounds of formula
$R^1$ is —NHC(O)$R^4$,
$R^2$ is —NHC(O)$R^6$ or —C(O)NH$R^7$, and
$R^3$ is —NHC(O)$R^8$ or —C(O)NH$R^9$,
wherein $R^4$, $R^6$, $R^7$, $R^8$ and $R^9$ have the meaning as indicated above.

In more preferred compounds of formula (1)
$R^1$ is —NHC(O)$R^4$,
$R^2$ is —NHC(O)$R^6$ or —C(O)NH$R^7$, and
$R^3$ is —NHC(O)$R^8$ or —C(O)NH$R^9$,
wherein $R^4$, $R^6$, $R^7$, $R^8$ and $R^9$ can be the same or different and are branched $C_{3-20}$-alkyl; $C_{2-20}$-alkyl interrupted by oxygen or sulfur; $C_{3-12}$-cycloalkyl unsubstituted or substituted by one or more $C_{1-20}$-alkyl; ($C_{3-12}$-cycloalkyl)-$C_{1-10}$-alkyl unsubstituted or substituted by one or more $C_{1-20}$-alkyl; a bicyclic or tricyclic hydrocarbon radical with 5 to 20 carbon atoms unsubstituted or substituted by one or more $C_{1-20}$-alkyl; phenyl unsubstituted or substituted by one or more radicals selected from $C_{1-20}$-alkyl, $C_{1-20}$-alkoxy, $C_{1-20}$-alkylamino, di($C_{1-20}$-alkyl)amino, hydroxy and nitro; phenyl-$C_{1-20}$-alkyl unsubstituted or substituted by one or more radicals selected from $C_{1-20}$-alkyl, $C_{3-12}$-cycloalkyl, phenyl, $C_{1-20}$-alkoxy and hydroxy; biphenyl-($C_{1-10}$-alkyl) unsubstituted or substituted by one or more $C_{1-20}$-alkyl; naphthyl-$C_{1-20}$-alkyl unsubstituted or substituted by one or more $C_{1-20}$-alkyl; or tri($C_{1-10}$-alkyl)silyl($C_{1-10}$-alkyl).

In more preferred compounds of formula (1)
$R^1$ is —NHC(O)$R^4$,
$R^2$ is —NHC(O)$R^6$, and
$R^3$ is —NHC(O)$R^8$,
wherein $R^4$, $R^6$ and $R^8$ have the same meaning as indicated above.

In more preferred compounds of formula (1)
$R^1$ is —NHC(O)$R^4$,
$R^2$ is —NHC(O)$R^6$, and
$R^3$ is —NHC(O)$R^8$,
wherein $R^4$, $R^6$ and $R^8$ are the same and different and are branched $C_{3-20}$-alkyl, preferably, branched $C_{3-20}$-alkyl, more preferably branched $C_{3-10}$-alkyl, most preferably branched $C_{3-10}$-alkyl with a quaternary C atom in position 1, in particular —C(CH$_3$)$_2$—H, or —C(CH$_3$)$_2$—(C$_1$-C$_7$alkyl), e.g. C(CH$_3$)$_2$—CH$_3$.

Examples of branched $C_{3-20}$-alkyl are 1-methylethyl, 2-methylpropyl, 1-methylpropyl, tert-butyl, 1-methylbutyl, 2-methylbutyl, 3-methylbutyl, 1,1-dimethylpropyl, 1-ethylpropyl, tert-butylmethyl, 1-methylpentyl, isoheptyl, 1-ethylhexyl, 2-ethylpentyl, 1-propylbutyl, isononyl, neononyl, 2,4,4-trimethylpentyl, undecyl, tridecyl, pentadecyl and heptadecyl.

Examples of branched $C_{3-10}$-alkyl are 1-methylethyl, 2-methylpropyl, 1-methylpropyl, tert-butyl, 1-methylbutyl, 2-methylbutyl, 3-methylbutyl, 1,1-dimethylpropyl, 1-ethylpropyl, tert-butylmethyl, 1-methylpentyl, isoheptyl, 1-ethylhexyl, 2-ethylpentyl, 1-propylbutyl, isononyl, neononyl, 2,4,4-trimethylpentyl.

The organic compound A carrying at least two amide functionalities can be 1,3,5-tris-[2,2-dimethylpropionylamino]benzene, sold under the tradename Ciba® Irgaclear® XT 386 by Ciba.

The organic compound C carrying at least two amide functionalities can be a compound of formula

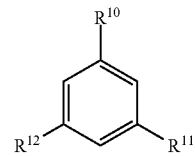

(2)

wherein
$R^{10}$ is —NHC(O)$R^{13}$ or —C(O)NH$R^{14}$
$R^{11}$ is —NHC(O)$R^{15}$ or —C(O)NH$R^{16}$, and
$R^{12}$ is —NHC(O)$R^{17}$or —C(O)NH$R^{18}$, wherein $R^{13}$ has the same meaning as indicated above for $R^4$, $R^{14}$ has the same meaning as indicated above for $R^5$, $R^{15}$ has the same meaning as indicated above for $R^6$, $R^{16}$ has the same meaning as indicated above for $R^7$, $R^{17}$ has the same meaning as indicated above for $R^8$ and $R^{18}$ has the same meaning as indicated above for $R^9$. The preferences given for the compound d of formula (1) apply accordingly to the compounds of formula (2).

Preferred sugar alcohol acetals and derivatives thereof can be compounds of formula

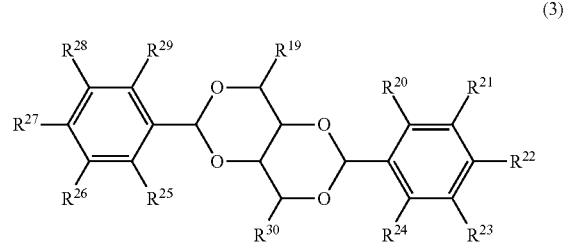

(3)

wherein $R^{19}$, $R^{20}$, $R^{21}$, $R^{22}$, $R^{23}$, $R^{24}$, $R^{25}$, $R^{26}$, $R^{27}$, $R^{28}$, $R^{29}$ and $R^{30}$ can be the same or different and are hydrogen or $C_{1-20}$-alkyl unsubsituted or substituted by one or more hydroxyl. Preferably, $R^{30}$ is 1,2-dihydroxyethyl. Preferably, $R^{19}$ is hydrogen or $C_{1-10}$-alkyl such as propyl. Preferably, $R^{20}$, $R^{21}$, $R^{22}$, $R^{23}$, $R^{24}$, $R^{25}$, $R^{26}$, $R^{27}$, $R^{28}$ and $R^{29}$ can be the same or different and are hydrogen or unsubstituted $C_{1-20}$-alkyl, in particular $C_{1-10}$-alkyl, e.g. methyl, ethyl or propyl. Preferably, $R^{20}$, $R^{23}$, $R^{24}$, $R^{25}$, $R^{26}$, $R^{27}$, $R^{28}$ are $R^{29}$ are hydrogen. Preferably, $R^{21}$, $R^{22}$, $R^{26}$ and $R^{27}$ can be the same or different and are hydrogen or unsubstituted $C_{1-20}$-alkyl, in particular $C_{1-10}$-alkyl, such as methyl, ethyl or propyl.

Examples of sugar alcohol acetals are 1,3:2,4-bis(benzylidene)sorbitol, sold under the tradename Ciba® Irgaclear® D by Ciba, 1,3:2,4-bis(4-methylbenzylidene)sorbitol, sold under the tradename Ciba® Irgaclear® DM by Ciba, 1,3:2,4-bis(4-ethylbenzylidene)-sorbitol, and in particular 1,3:2,4-bis(3,4-dimethylbenzylidene)sorbitol, for example as sold under the tradename Millad® 3988 by Milliken. An example of a sugar alcohol acetal derivative is the compound of formula (3) wherein $R^{19}$, $R^{22}$ and $R^{27}$ are propyl, $R^{30}$ is 1,2-dihydroxyethyl and $R^{20}$, $R^{21}$, $R^{23}$, $R^{24}$, $R^{25}$, $R^{26}$, $R^{28}$ and $R^{29}$ are hydrogen, sold under the tradename Millad® NX8000 by Milliken.

Examples of metal salts of organic acids are compounds of formulae

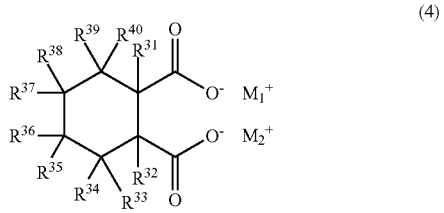

(4)

wherein $M_1$ and $M_2$ are the same or different and are selected from the group consisting of calcium, strontium, lithium, sodium, and monobasic aluminum, and wherein $R^{31}$, $R^{32}$, $R^{33}$, $R^{34}$, $R^{35}$, $R^{36}$, $R^{37}$, $R^{38}$, $R^{39}$ and $R^{40}$ are either the same or different and are individually selected from the group consisting of hydrogen, $C_{1-9}$-alkyl [wherein any two vicinal (neighboring) or geminal (same carbon) alkyl groups may be combined to form a carbocyclic ring of up to six carbon atoms], hydroxy, $C_{1-9}$-alkoxy, $C_{1-9}$-alkyleneoxy, amino, and $C_{1-9}$-alkylamino, halogeno, such as fluoro, chloro, bromo or iodo, and phenyl, and

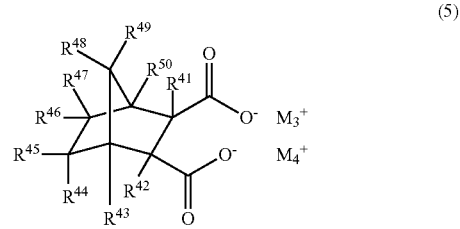

(5)

wherein $M_3$ and $M_4$ are the same or different and are independently selected from the group consisting of metal cations and organic cations, or the two metal ions are unified into a single metal ion (bivalent, for instance, such as calcium), and wherein $R^{41}$, $R^{42}$, $R^{43}$, $R^{44}$, $R^{45}$, $R^{46}$, $R^{47}$, $R^{48}$, $R^{49}$ and $R^{50}$ are either the same or different and are individually selected from the group consisting of hydrogen, $C_{1-9}$-alkyl [wherein any two vicinal (neighboring) or geminal (same carbon) alkyl groups may be combined to form a carbocyclic ring of up to six carbon atoms], hydroxy, $C_{1-9}$-alkoxy, $C_{1-9}$-alkyleneoxy, amino, and $C_{1-9}$-alkylamino, halogeno such as fluoro, chloro, bromo or iodo, phenyl and alkylphenyl.

Preferably, the metal cations are selected from the group consisting of calcium, strontium, barium, magnesium, aluminum, silver, sodium, lithium, rubidium, potassium, and the like. Within that scope, group I and group II metal ions are generally preferred. Among the group I and II cations, sodium, potassium, calcium and strontium are preferred, wherein sodium, calcium and lithium are most preferred. Furthermore, the $M_3$ and $M_4$ groups may also be combined to form a single metal cation (such as calcium, strontium, barium, magnesium, aluminium, including monobasic aluminium, and the like).

The term "monobasic aluminum" is well known and is intended to encompass an aluminium hydroxide group as a single cation bonded with the two carboxylic acid moieties.

The compounds of formula (4) are commonly referred to as monocyclic carboxylate salts. The stereochemistry at the asymmetric carbon atoms of the compounds of formula (4) may be cis or trans, although cis is preferred.

The compounds of formula (5) are commonly referred to as bicyclic carboxylate salts. The stereochemistry at the asymmetric carbon atoms of the compounds of formula (5) may be cis or trans, although cis is preferred wherein cis-endo is the most preferred embodiment.

Preferred examples of metal salts of organic acids are cis-endo-bicyclo[2.2.1]heptane-2,3-dicarboxylic acid disodium salt (an example of a bicyclic carboxylate salt of formula (5)), sold under the tradename Hyperform® HPN-68L by Milliken, and sodium benzoate, sold under tradename Ciba® Irgastab® NA 04. Further examples of metal salts of organic acids are cyclohexanedicaroxylic acid (1R, 2S), calcium salt (an example of a monocyclic carboxylate salts of formula (4)) and zinc stearate. A mixture of 2 parts cyclohexanedicarboxylic acid (1R,2S), calcium salt and 1 part zinc stearate is sold under the tradename Hyperform® HPN-20E by Milliken.

Other examples of metal salts of organic acids are compounds of formula

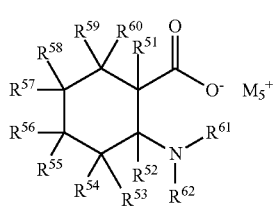

(6)

wherein $M_5$ is selected from the group consisting of calcium, strontium, lithium, sodium, and monobasic aluminum, and wherein $R^{51}$, $R^{52}$, $R^{53}$, $R^{54}$, $R^{55}$, $R^{56}$, $R^{57}$, $R^{58}$, $R^{59}$ and $R^{60}$ are either the same or different and have the same meaning as $R^{31}$, $R^{32}$, $R^{33}$, $R^{34}$, $R^{35}$, $R^{36}$, $R^{37}$, $R^{38}$, $R^{39}$ and $R^{40}$, and $R^{61}$ and $R^{62}$ can be $C_{1-9}$-alkyl.

An example of metal salt of an organic phosphoric acid is a metal salt of 2,2'-methylene bis(4,6-di-tert-butylphenyl) phosphate, for example sodium 2,2'-methylene bis(4,6-di-tert-butylphenyl)phosphate sold under the tradename Ciba® Irgastab® NA 11 by Ciba. Further examples of metal salts of 2,2'-methylene bis(4,6-di-tert-butylphenyl)phosphate are lithium 2,2'-methylene-bis(4,6-di-tert-butylphenyl)phosphate sold under the tradename ADK Stab NA 71 by Adeka, and aluminium-hydroxy-bis[2,2'-methylene-bis(4,6-di-tert-butylphenyl)phosphate. A mixture of 70% aluminium-hydroxy-bis[2,2'-methylene-bis(4,6-di-tert-butylphenyl)phosphate] and 30% lithium myristate is sold under the tradename ADK Stab NA 21 by Adeka.

Any metal salt of a polyol can be used. Of particular interest are divalent metal salts of polyhydroxylated $C_{2-20}$-alkanes, wherein the divalent metal is zinc, calcium, cobalt, boron, manganese, iron, magnesium, titanium or copper. Especially suitable polyols have 2 to 3 carbon atoms such as glycol or glycerol (glycerine). Preferred metal salts of polyols are metal salts of glycerol such as zinc glycerolate sold under the tradename Ciba® Irgastab® NA 287 by Ciba.

The precursor-systems of the metal salts of organic acids, the metal salts of organic phosphoric acids and the metal salts of polyols can be the corresponding acids, respectively, polyols in combination with a base, for example with a metal salt of a fatty acid such as lithium stearate. The corresponding acids or polyols can react with the base to form the respective metal salts of organic acids, the respective metal salts of organic phosphoric acids and the respective metal salts of polyols.

Compound B can be selected from the group consisting of sugar alcohol acetals and derivatives thereof, metal salts of organic acids and precursor-systems thereof, metal salts of organic phosphoric acids and precursor-systems thereof and metal salts of polyols and precursor-systems thereof, based on the weight of the polymer. In particular, compound B can be selected from the group consisting of metal salts of organic acids, metal salts of organic phosphoric acids and metal salts of polyols, and precursor-systems thereof.

A particular preferred composition comprises 12 to 10'000 ppm of 1,3,5-tris[2,2-dimethylpropionylamino]benzene, for example as sold under the tradename Ciba® Irgaclear® XT 386 by Ciba, as compound A, and 12 to 1'000 ppm of the sugar alcohol acetals of formula (3), in particular 1,3:2,4-bis(3,4-dimethylbenzylidene)sorbitol, for example as sold under the tradename Millad® 3988 by Milliken, as compound B.

Another particular preferred composition comprises 12 to 10'000 ppm of 1,3,5-tris-[2,2-dimethylpropionylamino]benzene, for example as sold under the tradename Ciba® Irgaclear® XT 386 by Ciba as compound A, and 12 to 1'000 ppm sodium 2,2'-methylene bis(4,6-di-tert-butylphenyl) phosphate, for example as sold under the tradename Ciba® Irgastab® NA 11 by Ciba, as compound B, or, but not preferred, a precursor-system thereof.

Another particular preferred composition comprises 12 to 10'000 ppm of 1,3,5-tris-[2,2-dimethylpropionylamino]benzene, for example as sold under the tradename Ciba® Irgaclear® XT 386 by Ciba, as compound A, and 12 to 1'000 ppm of lithium 2,2'-methylene-bis(4,6-di-tert-butylphenyl) phosphate, for example as sold under the tradename ADK Stab NA 71 by Adeka, as compound B, or, but not preferred, a precursor-system thereof.

Another particular preferred composition comprises 12 to 10'000 ppm of 1,3,5-tris-[2,2-dimethylpropionylamino]benzene, for example as sold under the tradename Ciba® Irgaclear® XT 386 by Ciba, as compound A, and 12 to 1'000 ppm of aluminium-hydroxy-bis[2,2'-methylene-bis(4,6-di-tert-butylphenyl)phosphate, for example as sold under the tradename ADK Stab NA 21 by Adeka, as compound B, or, but not preferred, a precursor-system thereof.

Another particular preferred composition comprises 12 to 10'000 ppm of 1,3,5-tris[2,2-dimethylpropionylamino]benzene, for example as sold under the tradename Ciba® Irgaclear® XT 386 by Ciba as compound A, and 12 to 1'000 ppm of cis-endo-bicyclo[2.2.1]heptane-2,3-dicarboxylic acid disodium salt, for example as sold under the tradename Hyperform® HPN-68L by Milliken, as compound B, or, but not preferred, a precursor-system thereof.

Another particular preferred composition comprises 12 to 10'000 ppm of 1,3,5-tris-[2,2-dimethylpropionylamino]benzene, for example as sold under the tradename Ciba® Irgaclear® XT 386 by Ciba, as compound A, and 12 to 1'000 ppm sodium benzoate, for example as sold under the tradename Ciba® Irgastab® NA 04 by Ciba, as compound B, or, but not preferred, a precursor-system thereof.

Another particular preferred composition comprises 12 to 10'000 ppm of 1,3,5-tris-[2,2-dimethylpropionylamino]benzene, for example as sold under the tradename Ciba® Irgaclear® XT 386 by Ciba as compound A, and 12 to 1'000 ppm of a mixture of 2 parts cyclohexanedicaroxylic acid (1R,2S), calcium salt and 1 part zinc stearate, for example as sold under the tradename Hyperform® HPN-20E by Milliken, as compound B, or, but not preferred, a precursor-system thereof.

Another particular preferred composition comprises 12 to 10'000 ppm of 1,3,5-tris-[2,2-dimethylpropionylamino]benzene, for example as sold under the tradename Ciba® Irgaclear® XT 386 by Ciba, as compound A, and 12 to 1'000 ppm of zinc glycerolate, for example as sold under the tradename Ciba® Irgastab® NA 287 by Ciba, as compound B, or, but not preferred, a precursor-system thereof.

The polymer can be a natural, or preferably, a synthetic polymer.

Examples of the synthetic polymer are:

1. Polymers of monoolefins and diolefins, for example polyethylene (which optionally can be crosslinked), high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE), polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, Polyolefins, i.e. the polymers of monoolefins exemplified in the preceding paragraph, preferably polyethylene and polypropylene, can be prepared by different, and especially by the following, methods:

radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example propylene/ethylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic. Stereoblock polymers are also included.

5. Aromatic homopolymers and copolymers derived from vinyl aromatic monomers including styrene, α-methylstyrene, all isomers of vinyl toluene, especially p-vinyl-toluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic. Stereoblock polymers are also included.

5a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

5b. Hydrogenated aromatic polymers derived from hydrogenation of polymers mentioned under 5.), especially including polycyclohexylethylene (PCHE) prepared by hydrogenating atactic polystyrene, often referred to as polyvinylcyclohexane (PVCH).

5c. Hydrogenated aromatic polymers derived from hydrogenation of polymers mentioned under 5a.).

Homopolymers and copolymers may have any stereostructure including syndiotactic, isotactic, hemi-isotactic or atactic. Stereoblock polymers are also included.

6. Homopolymers and copolymers of cyclic ethers such as polyalkylene glycols, polyethylene oxide, polypropylene oxide or copolymers thereof with bisglycidyl ethers.

7. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or 3-maleimidobenzoic acid N-hydroxysuccinimide ester (MBS).

8. Blends of polypropylene or polyethylene with other polymers such as PP/ethylene propylene rubber (EPDM), PP/ethylene propylene rubber (EPR), PP/ethylene vinyl acetate (EVA), PP/polybutylene terephthalate (PBT), PP/polyethylene terephthalate (PET), PP/polyamide (PA), PE/ethylene propylene rubber (EPDM), PE/ethylene propylene rubber (EPR), PE/ethylene vinyl acetate (EVA), PE/polybutylene terephthalate (PBT), PE/polyethylene terephthalate (PET), PE/polyamide (PA), 9. Metallocene-polypropylene, metallocene-polyethylene and any metallocene-catalyst-based copolymer of propylene and ethylene, respectively, with other alpha olefins are also suited to apply the present invention and to illustrate the technical benefits.

Preferred synthetic polymers are listed under the above items 1 to 3.

Particular preferred examples of the synthetic polymer are a polypropylene homopolymer, random copolymer, alternating or segmented copolymer, block copolymer or a blend of polypropylene with another synthetic polymer.

A polypropylene homopolymer is further preferred as polymer. Polypropylene homo-polymer also covers long chain branched polypropylene.

According to a further preferred embodiment of the present invention, the polymer is a polypropylene homopolymer or a polypropylene random copolymer, alternating or segmented copolymer or block copolymer containing one or more comonomers selected from the group consisting of ethylene, $C_4$-$C_{20}$-α-olefin, vinylcyclohexane, vinylcyclohexene, $C_4$-$C_{20}$alkandiene, $C_5$-$C_{12}$cycloalkandiene and norbornene derivatives; the total amount of propylene and the comonomer(s) being 100%.

Polypropylene copolymer also covers long chain branched polypropylene copolymer.

Examples of suitable $C_4$-$C_{20}$-α-olefins are 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene and 4-methyl-1-pentene.

Examples of suitable $C_4$-$C_{20}$alkandienes are hexadiene and octadiene.

Examples of suitable $C_5$-$C_{12}$cycloalkandienes are cyclopentadiene, cyclohexadiene and cyclooctadiene.

Examples of suitable norbornene derivatives are 5-ethylidene-2-norbornene (ENB), dicyclopentadiene (DCP) and methylene-domethylene-hexahydronaphthaline (MEN).

A propylene random copolymer comprising ethylene is a preferred synthetic polymer. A propylene/ethylene copolymer contains for example 50 to 99.9%, preferably 80 to 99.9%, in particular 90 to 99.9%, by weight of propylene.

A propylene copolymer wherein the comonomer is a $C_9$-$C_{20}$α-olefin such as e.g. 1-nonene, 1-decene, 1-undecene, 1-dodecene, 1-tetradecene, 1-hexadecene, 1-octadecene or 1-eicosene; $C_9$-$C_{20}$alkandiene, $C_9$-$C_{12}$cycloalkandiene or a norbornene derivative such as e.g. 5-ethylidene-2-norbornene (ENB) or methylene-domethylene-hexahydronaphthaline (MEN) contains preferably more than 90 mol %, in particular 90 to 99.9 mol % or 90 to 99 mol %, of propylene.

A propylene copolymer wherein the comonomer is a $C_4$-$C_8$α-olefin such as e.g. 1-butene, 1-pentene, 1-hexene, 1-heptene, 1-octene or 4-methyl-1-pentene; vinylcyclohexane, vinylcyclohexene, $C_4$-$C_8$alkandiene or $C_5$-$C_8$cycloalkandiene contains preferably more than 80 mol %, in particular 80 to 99.9 mol % or 80 to 99 mol %, of propylene.

Further preferred examples of a synthetic polymer are propylene/isobutylene copolymer, propylene/butadiene copolymer, propylene/cycloolefin copolymer, terpolymers of propylene with ethylene and a diene such as hexadiene, dicyclopentadiene or ethylidene-norbornene; propylene/1-olefin copolymers where the 1-olefin is generated in situ; and propylene/carbon monoxide copolymers.

Other preferred examples of a synthetic polymer are blends of polypropylene with propylene/ethylene copolymers, propylene/butylene copolymers, polyethylene, e.g. HDPE or LDPE; polybutene, polyisobutylene, poly-4-methylpentene or alternating or random polyalkylene/carbon monoxide copolymers. These blends contain preferably at least 50% by weight, relative to the weight of the total blend, of polypropylene.

Additional materials can optionally be added to the compositions of the present invention in a concentration range that does not adversely affect the beneficial effects of the invention. These materials may include lubricants, stabilizers, antioxidants, antibacterial agents, ultraviolet absorbers, thermostabilizers, light stabilizers, neutralizers, antistatic agents, antiblocking agents, heavy metal inactivation agents, flame retardants, lubricants, peroxides, hydrotalcite, foaming agents, elastomers, processing aids, nucleating agents, fillers and the like and mixtures thereof. The amount of the additional materials may be 100 to 10'000 parts per million (ppm) based on the weight of the polymer.

Examples of fillers are fiber glass, natural fibers such as hemp and kenaf, and inorganic materials such as basalt, talc and wollastonite, (fibrous) magnesium oxysulfate, chalk, kaolin, clay, graphite, graphene, carbon black and other organic or inorganic pigments, titanium dioxide and silicon dioxide.

The composition of the present invention can comprise 12 to 10'000, 12 to 5'000, 12 to 1'000, 12 to 500, 12 to 98 or 102 to 500 parts per million (ppm) of the organic compound A carrying at least two amide functionalities, based on the weight of the polymer.

The composition of the present invention can comprise from 12 to 500 parts per million (ppm), from 12 to 98 parts per million (ppm) or from 102 to 500 parts per million (ppm) of compound B, based on the weight of the polymer.

Also part of the invention is a process for preparing the composition of the present invention which comprises mixing an organic compound A carrying at least two amide functionalities, and 12 to 1'000 parts per million (ppm) of a compound B selected from the group consisting of organic compounds C carrying at least two amide functionalities, sugar alcohol acetals and derivatives thereof, metal salts of organic acids and precursor-systems thereof, metal salts of organic phosphoric acids and precursor-systems thereof, metal salts of polyols and precursor-systems thereof, and mixtures thereof, based on the weight of the polymer, with the polymer.

Also part of the invention is a shaped article obtainable from the composition of the present invention.

The shaped article can be, for example, obtained from the composition of the present invention by injection blow molding, extrusion, blow molding, rotomolding, in mold decoration (back injection), slush molding, injection molding, co-injection molding, forming, compression molding, pressing, film extrusion (cast film; blown film), fiber spinning (woven, non-woven), drawing (uniaxial, biaxial), annealing, deep drawing, calendaring, mechanical transformation, sintering, coextrusion, coating, lamination, cross-linking (radiation, peroxide, silane), vapor deposition, weld together, glue, vulkanization, thermoforming, pipe extrusion, profile extrusion, sheet extrusion; sheet casting, spin coating, strapping, foaming, recycling/rework, extrusion coating, visbreaking (peroxide, thermal), fiber melt blown, spun bonded, surface treatment (corona discharge, flame, plasma), sterilization (by gamma rays, electron beams), gel-coating, tape extrusion, SMC-process or plastisol.

A molded article is preferred. The molding is in particular affected by injection, blow, compression, roto-molding or slush-molding or extrusion.

Examples of shaped article are film fibers, profiles, pipes, bottles, tanks and containers.

Also part of the invention is the use of a mixture consisting of (i) an organic compound A carrying at least two amide functionalities, and (ii) a compound B selected from the group consisting of an organic compound C carrying at least two amide functionalities, sugar alcohol acetals and derivatives thereof, metal salts of organic acids and precursor-systems thereof, metal salts of organic phosphoric acids and precursor-systems thereof and metal salts of polyol and precursor-systems thereof, and mixtures thereof, for improving the mechanical properties, in particular the flexural (elastic) modulus, of a polymer.

Preferably, the polymer is a polypropylene homopolymer or a polypropylene random copolymer, alternating or segmented copolymer or block copolymer containing one or more comonomers selected from the group consisting of ethylene, $C_4$-$C_{20}$-α-olefin, vinylcyclohexane, vinylcyclohexene, $C_4$-$C_{20}$alkandiene, $C_5$-$C_{12}$cycloalkandiene and norbornene derivatives; the total amount of propylene and the comonomer(s) being 100%.

Preferably, the mixture consists of i) an organic compound A carrying at least two amide functionalities which is a compound of formula

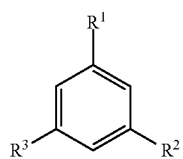

(1)

wherein $R^1$ is —NHC(O)$R^4$, $R^2$ is —NHC(O)$R^6$, and $R^3$ is —NHC(O)$R^8$, wherein $R^4$, $R^6$ and $R^8$ are the same and different and are branched $C_{3\text{-}20}$-alkyl unsubstituted or substituted by one or more hydroxyl, preferably, branched $C_{3\text{-}20}$-alkyl, more preferably branched $C_{3\text{-}10}$-alkyl, most preferably branched $C_{3\text{-}10}$-alkyl with a quaternary C atom in position 1, in particular C(CH$_3$)$_2$—CH$_3$.

and ii) compound B which is selected from the group consisting of metal salts of organic acids, metal salts of organic phosphoric acids and metal salts of polyol, and precursor-systems thereof.

Also part of the invention is the use of a mixture consisting of (i) an organic compound A carrying at least two amide functionalities, and (ii) a compound B selected from the group consisting of an organic compound C carrying at least two amide functionalities, sugar alcohol acetals and derivatives thereof, metal salts of organic acids and precursor-systems thereof, metal salts of organic phosphoric acids and precursor-systems thereof and metal salts of polyols and precursor-systems thereof, and mixtures thereof, for improving the scratch resistance of a polymer.

Preferably, the polymer is a polypropylene homopolymer or a polypropylene random copolymer, alternating or segmented copolymer or block copolymer containing one or more comonomers selected from the group consisting of ethylene, $C_4$-$C_{20}$-α-olefin, vinylcyclohexane, vinylcyclohexene, $C_4$-$C_{20}$alkandiene, $C_5$-$C_{12}$cycloalkandiene and norbornene derivatives; the total amount of propylene and the comonomer(s) being 100%.

Preferably, the mixture consists of i) an organic compound A carrying at least two amide functionalities which is a compound of formula

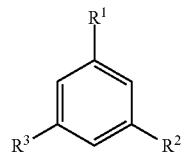

(1)

wherein $R^1$ is —NHC(O)$R^4$, $R^2$ is —NHC(O)$R^6$, and $R^3$ is —NHC(O)$R^8$, wherein $R^4$, $R^6$ and $R^8$ are the same and different and are branched $C_{3\text{-}20}$-alkyl unsubstituted or substituted by one or more hydroxyl, preferably, branched $C_{3\text{-}20}$-alkyl, more preferably branched $C_{3\text{-}10}$-alkyl, most preferably branched $C_{3\text{-}10}$-alkyl with a quaternary C atom in position 1, in particular C(CH$_3$)$_2$—CH$_3$.

and ii) a compound B which is selected from the group consisting of sugar alcohol acetals and derivatives thereof, metal salts of organic acids, metal salts of organic phosphoric acids and metal salts of polyol, and precursor-systems thereof.

The definitions and preferences given above for an organic compound A carrying at least two amide functionalities, organic compound C carrying at least two amide functionalities, sugar alcohol acetals and derivatives thereof, metal salts of organic acids and precursor-systems thereof, metal salts of organic phosphoric acids and precursor-systems thereof and metal salts of polyols and precursor-systems thereof apply accordingly.

The polymer compositions of the present invention show improved flexural (elastic) modulus, and at the same time an improved scratch resistance and an improved haze.

The polymer compositions of the present invention show improved scratch resistance. Polymer compositions comprising 1,3,5-tris[2,2-dimethylpropionylamino]benzene, for example as sold under the tradename Ciba® Irgaclear® XT 386 by Ciba, as compound A, and a sugar alcohol acetals of formula (3), in particular 1,3:2,4-bis(3,4-dimethylbenzylidene)sorbitol, for example as sold under the tradename Millad® 3988 by Milliken, as compound B show an improved scratch resistance and at the same time improved transparency.

EXAMPLES

Examples 1 to 11, and Comparative Examples 1 to 17

The nucleating agents and mixtures of nucleating agents as indicated in table 1 are mixed with dry powder form polypropylene (PP), random copolymer comprising 4 mole % ethylene (RD 204 CF from Borealis AG, Vienna, Austria) in a high speed mixer (Mixaco Lab CM 12) and are compounded at 230° C. to pellets in a twin-extruder (Berstorff ZE 25×33 D). Polypropylene (PP) random copolymer without nucleating agents is treated analogously (comparative example 1).

TABLE 1

| Example No. | Nucleating agent | [ppm]$^a$ |
|---|---|---|
| Comp. ex. 1 | — | — |
| Comp. ex. 2 | Millad ® 3988$^b$ | 1800 |
| Comp. ex. 3 | Millad ® 3988$^b$ | 450 |
| Comp. ex. 4 | Millad ® 3988$^b$ | 300 |
| Comp. ex. 5 | Millad ® 3988$^b$ | 150 |

TABLE 1-continued

| Example No. | Nucleating agent | [ppm]$^a$ |
|---|---|---|
| Comp. ex. 6 | Ciba ® Irgastab ® NA 11$^c$ | 450 |
| Comp. ex. 7 | Ciba ® Irgastab ® NA 11$^c$ | 300 |
| Comp. ex. 8 | Ciba ® Irgastab ® NA 11$^c$ | 150 |
| Comp. ex. 9 | Hyperform ® HPN-68L$^d$ | 230 |
| Comp. ex. 10 | Hyperform ® HPN-68L$^d$ | 150 |
| Comp. ex. 11 | Ciba ® Irgastab ® NA 287$^e$ | 230 |
| Comp. ex. 12 | Ciba ® Irgastab ® NA 287$^e$ | 150 |
| Comp. ex. 13 | Ciba ® Irgastab ® NA 04$^f$ | 850 |
| Comp. ex. 14 | Ciba ® Irgaclear ® XT 386$^g$ | 450 |
| Comp. ex. 15 | Ciba ® Irgaclear ® XT 386$^g$ | 300 |
| Comp. ex. 16 | Ciba ® Irgaclear ® XT 386$^g$ | 230 |
| Comp. ex. 17 | Ciba ® Irgaclear ® XT 386$^g$ | 150 |
| Ex. 1 | Millad ® 3988$^b$ | 300 |
|  | Ciba ® Irgaclear ® XT 386$^g$ | 150 |
| Ex. 2 | Millad ® 3988$^b$ | 150 |
|  | Ciba ® Irgaclear ® XT 386$^g$ | 150 |
| Ex. 3 | Ciba ® Irgastab ® NA 11$^c$ | 300 |
|  | Ciba ® Irgaclear ® XT 386$^g$ | 150 |
| Ex. 4 | Ciba ® Irgastab ® NA 11$^c$ | 150 |
|  | Ciba ® Irgaclear ® XT 386$^g$ | 150 |
| Ex. 6 | Hyperform ® HPN-68L$^d$ | 75 |
|  | Ciba ® Irgaclear ® XT 386$^g$ | 155 |
| Ex. 7 | Hyperform ® HPN-68L$^d$ | 75 |
|  | Ciba ® Irgaclear ® XT 386$^g$ | 75 |
| Ex. 8 | Ciba ® Irgastab ® NA 287$^e$ | 75 |
|  | Ciba ® Irgaclear ® XT 386$^g$ | 75 |
| Ex. 9 | Ciba ® Irgastab ® NA 287$^e$ | 75 |
|  | Ciba ® Irgaclear ® XT 386$^g$ | 155 |
| Ex. 11 | Ciba ® Irgastab ® NA 04$^f$ | 850 |
|  | Ciba ® Irgaclear ® XT 386$^g$ | 150 |

$^a$by weight based on the weight of the polypropylene (PP) random copolymer.
$^b$Millad ® 3988 (Milliken) is 1,3:2,4-bis(3,4-dimethylbenzylidene)sorbitol.
$^c$Ciba ® Irgastab ® NA 11 is sodium 2,2'-methylene bis(4,6-di-tert-butylphenyl)phosphate of formula

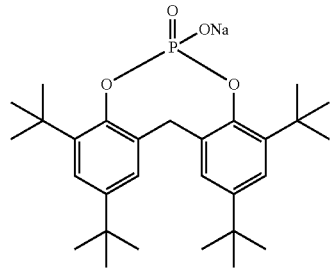

$^d$Hyperform ® HPN-68L (Milliken) is a blend of the following compounds: 80% by weight cis-endo-bicyclo[2.2.1]heptane-2,3-dicarboxylic acid, disodium salt, 10% by weight (Z)-13-docosenamide and 10% by weight amorphous silicon dioxide.
$^e$Ciba ® Irgastab NA 287 is zinc glycerolate.
$^f$Ciba ® Irgastab ® NA 04 is sodium benzoate.
$^g$Ciba ® Irgaclear ® XT 386 is 1,3,5-tris[2,2-dimethylpropionylamino]benzene.

Testing of Flexural Modulus

The pellets of examples 1 to 4, 6 to 9 and 11, and comparative examples 1 to 4, 6, 7 and 9 to 13, 16 and 17 are injection molded at 200° C. to obtain 4 mm thick bars of 10 mm width and 80 mm length.

The bars are subjected to a "3-point bending test" according to ISO 178. The flexural modulus or elastic modulus ($E_f$) is determined from the linear regime of the stress-strain curves. The flexural or elastic modulus is a measure of the stiffness of the polymer material. The results are outlined in table 2.

TABLE 2

| Example No. | Nucleating agent | [ppm]$^a$ | flexural modulus [MPa] | Calculated flexural modulus$^h$ [MPa] |
|---|---|---|---|---|
| Comp. ex. 1 | — | — | 1039 | — |
| Comp. ex. 2 | Millad ® 3988$^b$ | 1800 | 1239 | — |
| Comp. ex. 3 | Millad ® 3988$^b$ | 450 | 1060 | — |
| Comp. ex. 4 | Millad ® 3988$^b$ | 300 | 1075 | — |
| Comp. ex. 6 | Ciba ® Irgastab ® NA 11$^c$ | 450 | 1415 | — |
| Comp. ex. 7 | Ciba ® Irgastab ® NA 11$^c$ | 300 | 1411 | — |
| Comp. ex. 9 | Hyperform ® HPN-68L$^d$ | 230 | 1249 | — |
| Comp. ex. 10 | Hyperform ® HPN-68L$^d$ | 150 | 1250 | — |
| Comp. ex. 11 | Ciba ® Irgastab ® NA 287$^e$ | 230 | 1170 | — |
| Comp. ex. 12 | Ciba ® Irgastab ® NA 287$^e$ | 150 | 1166 | — |
| Comp. ex. 13 | Ciba ® Irgastab ® NA 04$^f$ | 850 | 1275 | — |
| Comp. ex. 16 | Ciba ® Irgaclear ® XT 386$^g$ | 230 | 1339 | — |
| Comp. ex. 17 | Ciba ® Irgaclear ® XT 386$^g$ | 150 | 1233 | — |
| Ex. 1 | Millad ® 3988$^b$ | 300 | 1331 | — |
|  | Ciba ® Irgaclear ® XT 386$^g$ | 150 |  |  |
| Ex. 2 | Millad ® 3988$^b$ | 150 | 1275 | — |
|  | Ciba ® Irgaclear ® XT 386$^g$ | 150 |  |  |
| Ex. 3 | Ciba ® Irgastab ® NA 11$^c$ | 300 | 1444 | — |
|  | Ciba ® Irgaclear ® XT 386$^g$ | 150 |  |  |
| Ex. 4 | Ciba ® Irgastab ® NA 11$^c$ | 150 | 1434 | — |
|  | Ciba ® Irgaclear ® XT 386$^g$ | 150 |  |  |
| Ex. 6 | Hyperform ® HPN-68L$^d$ | 75 | 1350 | 1309.3 |
|  | Ciba ® Irgaclear ® XT 386$^g$ | 155 |  |  |
| Ex. 7 | Hyperform ® HPN-68L$^d$ | 75 | 1256 | 1241.5 |
|  | Ciba ® Irgaclear ® XT 386$^g$ | 75 |  |  |
| Ex. 8 | Ciba ® Irgastab ® NA 287$^e$ | 75 | 1240 | 1199.5 |
|  | Ciba ® Irgaclear ® XT 386$^g$ | 75 |  |  |
| Ex. 9 | Ciba ® Irgastab ® NA 287$^e$ | 75 | 1366 | 1283.2 |
|  | Ciba ® Irgaclear ® XT 386$^g$ | 155 |  |  |
| Ex. 11 | Ciba ® Irgastab ® NA 04$^f$ | 850 | 1274 | — |
|  | Ciba ® Irgaclear ® XT 386$^g$ | 150 |  |  |

$^{a-g}$see table 1.
$^h$the calculated flexural (elastic) modulus of n ppm of a mixture of a % A and b % B = a % × "flexural (elastic) modulus of n ppm A" + b % × "flexural (elastic) modulus of n ppm B". For example the calculated flexural (elastic) modulus of 230 ppm of a mixture of 33% Hyperform ® HPN-68L and 67% Ciba ® Irgaclear ® XT 386 (example 6) = 33% × "flexural (elastic) modulus of 230 ppm Hyperform ® HPN-68L" + 67% × "flexural (elastic) modulus of 230 ppm Ciba ® Irgaclear ® XT 386" = 33% × 1249 + 67% × 1339 = 1309.3.

As can be seen from table 2 polypropylene copolymer compositions comprising 75 ppm Hyperform® HPN-68L and 155 ppm Ciba® Irgaclear® XT 386 (example 6) show an improved (higher) flexural (elastic) modulus, namely 1350 MPa, compared with the polypropylene copolymer compositions comprising 230 ppm Hyperform® HPN-68L (flexural modulus=1249 MPa, comparative example 9) or 230 ppm Ciba® Irgaclear® XT 386 (flexural modulus=1339 MPa, comparative example 16). The effect is not of additive nature, but synergistic as can be seen when comparing the measured flexural (elastic) modulus (1350 MPa) with the calculated flexural (elastic) modulus (1309.3 MPa).

Table 2 shows the same effect regarding the flexural (elastic) modulus of the polypropylene copolymer compositions comprising 75 ppm Hyperform® HPN-68L and 75 ppm Ciba® Irgaclear® XT 386 (example 7), 75 ppm Ciba® Irgastab® NA 287 and 75 ppm Ciba® Irgaclear® XT 386 (example 8), respectively, 75 ppm Ciba® Irgastab® NA 287 and 155 ppm Ciba® Irgaclear® XT 386 (example 9).

Testing of Haze

The pellets of examples 1 to 4, 6 to 9, and 11, and comparative examples 1 to 7 and 9 to 17 are molded at 230°

C. to plaques with a thickness of 1 mm using a standard injection molding machine (Engel HL 60).

The hazes the plaques are analysed using a Haze-gard plus instrument (BYK Gardner Gmbh Germany) in accordance with ASTM standard D1003. In this test, haze is commonly defined as that portion of visible light that is scattered at wider angles (2.5°<θ<90°) and is a measure for the turbidity of a sample.

The results are outlined in table 3.

TABLE 3

| Example No. | Nucleating agent | [ppm]$^a$ | Haze [%] | Calculated Haze$^i$ [%] |
|---|---|---|---|---|
| Comp. ex. 1 | — | — | 40.32 | — |
| Comp. ex. 2 | Millad ® 3988$^b$ | 1800 | 12.16 | — |
| Comp. ex. 3 | Millad ® 3988$^b$ | 450 | 38.36 | — |
| Comp. ex. 4 | Millad ® 3988$^b$ | 300 | 39.50 | — |
| Comp. ex. 5 | Millad ® 3988$^b$ | 150 | 39.06 | — |
| Comp. ex. 6 | Ciba ® Irgastab ® NA 11$^c$ | 450 | 23.28 | — |
| Comp. ex. 7 | Ciba ® Irgastab ® NA 11$^c$ | 300 | 25.74 | — |
| Comp. ex. 9 | Hyperform ® HPN-68L$^d$ | 230 | 47.90 | — |
| Comp. ex. 10 | Hyperform ® HPN-68L$^d$ | 150 | 52.90 | — |
| Comp. ex. 11 | Ciba ® Irgastab ® NA 287$^e$ | 230 | 52.16 | — |
| Comp. ex. 12 | Ciba ® Irgastab ® NA 287$^e$ | 150 | 53.88 | — |
| Comp. ex. 13 | Ciba ® Irgastab ® NA 04$^f$ | 850 | 39.38 | — |
| Comp. ex. 14 | Ciba ® Irgaclear ® XT 386$^g$ | 450 | 12.66 | — |
| Comp. ex. 15 | Ciba ® Irgaclear ® XT 386$^g$ | 300 | 13.28 | — |
| Comp. ex. 16 | Ciba ® Irgaclear ® XT 386$^g$ | 230 | 14.90 | — |
| Comp. ex. 17 | Ciba ® Irgaclear ® XT 386$^g$ | 150 | 14.50 | — |
| Ex. 1 | Millad ® 3988$^b$ | 300 | 11.06 | 29.90 |
| | Ciba ® Irgaclear ® XT 386$^g$ | 150 | | |
| Ex. 2 | Millad ® 3988$^b$ | 150 | 12.44 | 26.39 |
| | Ciba ® Irgaclear ® XT 386$^g$ | 150 | | |
| Ex. 3 | Ciba ® Irgastab ® NA 11$^c$ | 300 | 18.72 | 19.78 |
| | Ciba ® Irgaclear ® XT 386$^g$ | 150 | | |
| Ex. 4 | Ciba ® Irgastab ® NA 11$^c$ | 150 | 18.64 | 19.51 |
| | Ciba ® Irgaclear ® XT 386$^g$ | 150 | | |
| Ex. 6 | Hyperform ® HPN-68L$^d$ | 75 | 15.30 | 25.80 |
| | Ciba ® Irgaclear ® XT 386$^g$ | 155 | | |
| Ex. 7 | Hyperform ® HPN-68L$^d$ | 75 | 33.00 | 33.70 |
| | Ciba ® Irgaclear ® XT 386$^g$ | 75 | | |
| Ex. 8 | Ciba ® Irgastab ® NA 287$^e$ | 75 | 27.48 | 34.19 |
| | Ciba ® Irgaclear ® XT 386$^g$ | 75 | | |
| Ex. 9 | Ciba ® Irgastab ® NA 287$^e$ | 75 | 16.18 | 27.2 |
| | Ciba ® Irgaclear ® XT 386$^g$ | 155 | | |
| Ex. 11 | Ciba ® Irgastab ® NA 04$^f$ | 850 | 30.42 | — |
| | Ciba ® Irgaclear ® XT 386$^g$ | 150 | | |

$^{a-g}$see table 1.
$^i$the calculated Haze of n ppm of a mixture of a % A and b % B = a % × "Haze of n ppm A" + b % × "Haze of n ppm B".

For example the calculated Haze of 230 ppm of a mixture of 33% Hyperform® HPN-68L and 67% Ciba® Irgaclear® XT 386 (example 6)=33%×"Haze of 230 ppm Hyperform® HPN-68L"+67%×"Haze of 230 ppm Ciba® Irgaclear® XT 386"=33%×47.90+67%×14.90=25.8.

As can be seen from table 3 polypropylene copolymer compositions comprising 300 ppm Millad® 3988 and 150 ppm Ciba® Irgaclear® XT 386 (example 1) show an improved (lower) haze, namely 11.06, compared with the polypropylene copolymer compositions comprising 450 ppm Millad® 3988 (haze=38.36, comparative example 3) or 450 ppm Ciba® Irgaclear® XT 386 (haze=12.66, comparative example 14). The effect is not of additive nature, but synergistic as can be seen when comparing the measured haze (11.06) with the calculated haze (29.90).

Table 3 shows the same effect regarding haze of the polypropylene copolymer compositions comprising 150 ppm Millad® 3988 and 150 ppm Ciba® Irgaclear® XT 386 (example 2), 300 ppm Ciba® Irgastab® NA 11 and 150 ppm Ciba® Irgaclear® XT 386 (example 3), 150 ppm Ciba® Irgastab® NA 11 and 150 ppm Ciba® Irgaclear® XT 386 (example 4), 75 ppm Hyperform® HPN-68L and 155 ppm Ciba® Irgaclear® XT 386 (example 6), 75 ppm Hyperform® HPN-68L and 75 ppm Ciba® Irgaclear® XT 386 (example 7), 75 ppm Ciba® Irgastab® NA 287 and 75 ppm Ciba® Irgaclear® XT 386 (example 8), respectively, 75 ppm Ciba® Irgastab® NA 287 and 155 ppm Ciba® Irgaclear® XT 386 (example 9).

Measurement of Scratch Resistance

The pellets of examples 1, 2, 4, 5, 10 and 11, and comparative examples 1, 2, 4, 5, 8, 10, 12, 13 and 17 are molded at 230° C. to plaques with a thickness of 1 mm using a standard injection molding machine (Engel HL 60). The scratch resistance of the plaques is analysed with an Erichson Sratch Tester by moving a sharp tip of 1 mm radius over the plaques at a velocity of 1000 mm/min and a normal force of 10 N. Evaluation of the scratch resistance is assessed by visual inspection as the transparent or translucent nature of the samples prevented changes in L* to be determined. The results are outlined in table 4. The transparency is also analysed by visual inspection. The results are also outlined in table 4.

TABLE 4

| Example No. | Nucleating agent | [ppm]$^a$ | Scratch resistance | Transparency |
|---|---|---|---|---|
| Comp. ex. 1 | — | — | low | low |
| Comp. ex. 2 | Millad ® 3988$^b$ | 1800 | low | high |
| Comp. ex. 4 | Millad ® 3988$^b$ | 300 | medium | low |
| Comp. ex. 5 | Millad ® 3988$^b$ | 150 | medium | low |
| Comp. ex. 8 | Ciba ® Irgastab ® NA 11$^c$ | 150 | medium | low |
| Comp. ex. 10 | Hyperform ® HPN-68L$^d$ | 150 | medium | low |
| Comp. ex. 12 | Ciba ® Irgastab ® NA 287$^e$ | 150 | medium | low |
| Comp. ex. 13 | Ciba ® Irgastab ® NA 04$^f$ | 850 | medium | low |
| Comp. ex. 17 | Ciba ® Irgaclear ® XT 386$^g$ | 150 | medium | high |
| Ex. 1 | Millad ® 3988$^b$ | 300 | high | high |
| | Ciba ® Irgaclear ® XT 386$^g$ | 150 | | |
| Ex. 2 | Millad ® 3988$^b$ | 150 | high | high |
| | Ciba ® Irgaclear ® XT 386$^g$ | 150 | | |
| Ex. 4 | Ciba ® Irgastab ® NA 11$^c$ | 150 | high | medium |
| | Ciba ® Irgaclear ® XT 386$^g$ | 150 | | |
| Ex. 5 | Hyperform ® HPN-68L$^d$ | 150 | high | medium |
| | Ciba ® Irgaclear ® XT 386$^g$ | 150 | | |
| Ex. 10 | Ciba ® Irgastab ® NA 287$^e$ | 150 | high | medium |
| | Ciba ® Irgaclear ® XT 386$^g$ | 150 | | |
| Ex. 11 | Ciba ® Irgastab ® NA 04$^f$ | 850 | high | medium |
| | Ciba ® Irgaclear ® XT 386$^g$ | 150 | | |

$^{a-g}$see table 1.

As can be seen from table 4, polypropylene copolymer compositions comprising 300 ppm Millad® 3988 and 150 ppm Ciba® Irgaclear® XT 386 (example 1),150 ppm Millad® 3988 and 150 ppm Ciba® Irgaclear® XT 386 (example 2), 150 ppm Ciba® Irgastab® NA 11 and 150 ppm Ciba® Irgaclear® XT 386 (example 4), 150 ppm Hyperform® HPN-68L and 150 ppm Ciba® Irgaclear® XT 386 (example 5), 150ppm Ciba® Irgastab® NA 287 and 150 ppm Ciba® Irgaclear® XT 386 (example 10), respectively, 850 ppm Ciba® Irgastab® NA 04and 150 ppm Ciba® Irgaclear® XT 386 (example 11) all show a high scratch resistance. The polypropylene copolymer compositions comprising 300 ppm Millad® 3988 and 150 ppm Ciba® Irgaclear® XT 386 (example 1), respectively, 150 ppm Millad® 3988 and 150 ppm Ciba® Irgaclear® XT 386 (example 2) also show a high transparency.

Examples 12 to 14, and Comparative Examples 18 to 22

The nucleating agents and mixtures of nucleating agents as indicated in table 5 are mixed with dry powder form polypropylene (PP) random copolymer comprising 4 mole % ethylene (RD 204 MFI 8 from Borealis AG, Vienna, Austria) in a high speed mixer (Mixaco Lab CM 12) and are compounded at 230° C. to pellets in a twin-extruder (Berstorff ZE 25×46 D).

TABLE 5

| Example No. | Nucleating agent | [ppm]$^a$ |
|---|---|---|
| Comp. ex. 18 | ADK Stab NA 71$^j$ | 450 |
| Comp. ex. 19 | ADK Stab NA 71$^j$ | 300 |
| Comp. ex. 20 | ADK Stab NA 21$^k$ | 450 |
| Comp. ex. 21 | Ciba ® Irgaclear ® XT 386$^g$ | 450 |
| Comp. ex. 22 | Ciba ® Irgaclear ® XT 386$^g$ | 300 |
| Ex. 12 | ADK Stab NA 71$^j$ | 150 |
|  | Ciba ® Irgaclear ® XT 386$^g$ | 150 |
| Ex. 13 | ADK Stab NA 71$^j$ | 300 |
|  | Ciba ® Irgaclear ® XT 386$^g$ | 150 |
| Ex. 14 | ADK Stab NA 21$^k$ | 300 |
|  | Ciba ® Irgaclear ® XT 386$^g$ | 150 |

$^a$by weight based on the weight of the polypropylene (PP) random copolymer.
$^g$Ciba ® Irgaclear ® XT 386 is 1,3,5-tris[2,2-dimethylpropionylamino]benzene.
$^j$ADK Stab NA 71 (Adeka) is lithium 2,2'-methylene-bis (4,6-di-tert-butylphenyl) phosphate of formula

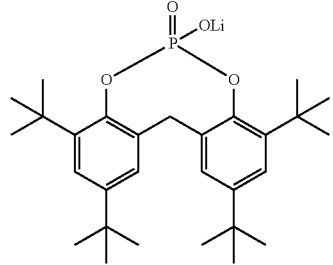

$^k$ADK Stab NA 21 (Adeka) is a mixture of 70% aluminium-hydroxy-bis [2,2'-methylene-bis (4,6-di-tert-butylphenyl) phosphate] and 30% lithium myristate.

Measurement of Flexural Modulus

The pellets of examples 12 to 13, and comparative examples 18 to 22 are injection molded at 200° C. to obtain 4 mm thick bars of 40 mm width and 80 mm length.

The bars are subjected to a "3-point bending test" according to ISO 178. The flexural modulus or elastic modulus ($E_f$) is determined from the linear regime of the stress-strain curves. The flexural or elastic modulus is a measure of the stiffness of the polymer material. The results are outlined in table 6.

TABLE 6

| Example No. | Nucleating agent | [ppm]$^a$ | flexural modulus [MPa] | Calculated flexural modulus$^h$ [MPa] |
|---|---|---|---|---|
| Comp. ex. 18 | ADK Stab NA 71$^j$ | 450 | 1113 | — |
| Comp. ex. 19 | ADK Stab NA 71$^j$ | 300 | 1110 | — |
| Comp. ex. 20 | ADK Stab NA 21$^k$ | 450 | 1083 | — |
| Comp. ex. 21 | Ciba ® Irgaclear ® XT 386$^g$ | 450 | 1147 | — |
| Comp. ex. 22 | Ciba ® Irgaclear ® XT 386$^g$ | 300 | 1165 | — |
| Ex. 12 | ADK Stab NA 71$^j$ | 150 | 1177 | 1137.5 |
|  | Ciba ® Irgaclear ® XT 386$^g$ | 150 |  |  |
| Ex. 13 | ADK Stab NA 71$^j$ | 300 | 1144 | 1124.2 |
|  | Ciba ® Irgaclear ® XT 386$^g$ | 150 |  |  |
| Ex. 14 | ADK Stab NA 21$^k$ | 300 | 1172 | 1104.1 |
|  | Ciba ® Irgaclear ® XT 386$^g$ | 150 |  |  |

$^{a, g, j\ and\ k}$see table 5.
$^h$the calculated flexural (elastic) modulus of n ppm of a mixture of a % A and b % B = a % × "flexural (elastic) modulus of n ppm A" + b % × "flexural (elastic) modulus of n ppm B".

For example the calculated flexural (elastic) modulus of 300 ppm of a mixture of 50% ADK Stab NA 71$^j$ and 50% Ciba® Irgaclear® XT 386 (example 12)=50%×"flexural (elastic) modulus of 300 ppm ADK Stab NA 71$^j$"+50%× "flexural (elastic) modulus of 300 ppm Ciba® Irgaclear® XT 386"=50%×1110+50%×1165=1137.5.

As can be seen from table 6 polypropylene copolymer compositions comprising 150 ppm ADK Stab NA 71 and 150 ppm Ciba® Irgaclear® XT 386 (example 12) show an improved (higher) flexural (elastic) modulus, namely 1177 MPa, compared with the polypropylene copolymer compositions comprising 300 ppm ADK Stab NA 71 (flexural modulus=1110 MPa, comparative example 19) or 300 ppm Ciba® Irgaclear® XT 386 (flexural modulus=1165 MPa, comparative example 22). The effect is not of additive nature, but synergistic as can be seen when comparing the measured flexural (elastic) modulus (1177 MPa) with the calculated flexural (elastic) modulus (1137.5 MPa).

Table 6 shows the same effect regarding the flexural (elastic) modulus of the polypropylene copolymer compositions comprising 300 ppm ADK Stab NA 71 and 150 ppm Ciba® Irgaclear® XT 386 (example 13), respectively, 300 ppm ADK Stab NA 21 and 150 ppm Ciba® Irgaclear® XT 386 (example 14).

Measurement of Haze

The pellets of examples 12 to 13, and comparative examples 18 to 22 are molded at 200° C. to plaques with a thickness of 2 mm using a standard injection molding machine (Arburg 320S).

The hazes the plaques are analysed using a Haze-gard plus instrument (BYK Gardner Gmbh Germany) in accordance with ASTM standard D1003. In this test, haze is commonly defined as that portion of visible light that is scattered at wider angles (2.5°<θ<90°) and is a measure for the turbidity of a sample.

The results are outlined in table 7.

TABLE 7

| Example No. | Nucleating agent | [ppm]$^a$ | Haze [%] | Calculated Haze$^i$ |
|---|---|---|---|---|
| Comp. ex. 18 | ADK Stab NA 71$^j$ | 450 | 76.46 |  |
| Comp. ex. 19 | ADK Stab NA 71$^j$ | 300 | 78.60 |  |

TABLE 7-continued

| Example No. | Nucleating agent | [ppm]$^a$ | Haze [%] | Calculated Haze$^i$ |
|---|---|---|---|---|
| Comp. ex. 20 | ADK Stab NA 21$^k$ | 450 | 70.04 | |
| Comp. ex. 21 | Ciba ® Irgaclear ® XT 386$^g$ | 450 | 76.84 | |
| Comp. ex. 22 | Ciba ® Irgaclear ® XT 386$^g$ | 300 | 59.98 | |
| Ex. 12 | ADK Stab NA 71$^j$ | 150 | 41.00 | 69.29 |
| | Ciba ® Irgaclear ® XT 386$^g$ | 150 | | |
| Ex. 13 | ADK Stab NA 71$^j$ | 300 | 42.90 | 76.58 |
| | Ciba ® Irgaclear ® XT 386$^g$ | 150 | | |
| Ex. 14 | ADK Stab NA 21$^k$ | 300 | 40.46 | 72.28 |
| | Ciba ® Irgaclear ® XT 386$^g$ | 150 | | |

$^{a,g,j\ and\ k}$see table 5.
$^i$the calculated Haze of n ppm of a mixture of a % A and b % B = a % × "Haze of n ppm A" + b % × "Haze of n ppm B".

For example the calculated Haze of 300 ppm of a mixture of 50% ADK Stab NA 71 and 50% Ciba® Irgaclear® XT 386 (example 12)=50%×"Haze of 300 ADK Stab NA 71"+ 50%×"Haze of 300 ppm Ciba® Irgaclear® XT 386"=50%× 78.60 +50%×59.98=69.29

As can be seen from table 7 polypropylene copolymer compositions comprising 150 ppm ADK Stab NA 71 and 150 ppm Ciba® Irgaclear® XT 386 (example 12) show an improved (lower) haze, namely 41.00, compared with the polypropylene copolymer compositions comprising 300 ppm ADK Stab NA 71 (haze=78.60, comparative example 19) or 300 ppm Ciba® Irgaclear® XT 386 (haze=59.98, comparative example 22). The effect is not of additive nature, but synergistic as can be seen when comparing the measured haze (41.00) with the calculated haze (69.29).

Table 7 shows the same effect regarding haze of the polypropylene copolymer compositions comprising 300 ppm ADK Stab NA 71 and 150 ppm Ciba® Irgaclear® XT 386 (example 13), respectively, 300 ppm ADK Stab NA 21 and 150 ppm Ciba® Irgaclear® XT 386 (example 14)

Examples 15 to 17, and Comparative Examples 23 to 27

The nucleating agents and mixtures of nucleating agents as indicated in table 8 are mixed with dry powder form polypropylene (PP) homopolymer (Moplen HP 500N, MFI 12) in a high speed mixer (Mixaco Lab CM 12) and are compounded at 230° C. to pellets in a twin-extruder (Berstorff ZE 25×46 D).

TABLE 8

| Example No. | Nucleating agent | [ppm]$^a$ |
|---|---|---|
| Comp. ex. 23 | ADK Stab NA 71$^j$ | 480 |
| Comp. ex. 24 | ADK Stab NA 71$^j$ | 330 |
| Comp. ex. 25 | ADK Stab NA 21$^k$ | 480 |
| Comp. ex. 26 | Ciba ® Irgaclear ® XT 386$^g$ | 480 |
| Comp. ex. 27 | Ciba ® Irgaclear ® XT 386$^g$ | 330 |
| Ex. 15 | ADK Stab NA 71$^j$ | 150 |
| | Ciba ® Irgaclear ® XT 386$^g$ | 180 |
| Ex. 16 | ADK Stab NA 71$^j$ | 300 |
| | Ciba ® Irgaclear ® XT 386$^g$ | 180 |
| Ex. 17 | ADK Stab NA 21$^k$ | 300 |
| | Ciba ® Irgaclear ® XT 386$^g$ | 180 |

$^a$by weight based on the weight of the polypropylene (PP) homopolymer.
$^{g,j\ and\ k}$see table 5.

Measurement of Flexural Modulus

The pellets of examples 15 to 17, and comparative examples 23 to 27 are injection molded at 200° C. (Arburg 320S) to obtain 4 mm thick bars of 40 mm width and 80 mm length.

The bars are subjected to a "3-point bending test" according to ISO 178. The flexural modulus or elastic modulus ($E_f$) is determined from the linear regime of the stress-strain curves. The flexural or elastic modulus is a measure of the stiffness of the polymer material. The results are outlined in table 9.

TABLE 9

| Example No. | Nucleating agent | [ppm]$^a$ | flexural modulus [MPa] | Calculated flexural modulus$^h$ [MPa] |
|---|---|---|---|---|
| Comp. ex. 23 | ADK Stab NA 71$^j$ | 480 | 1736 | |
| Comp. ex. 24 | ADK Stab NA 71$^j$ | 330 | 1727 | |
| Comp. ex. 25 | ADK Stab NA 21$^k$ | 480 | 1714 | |
| Comp. ex. 26 | Ciba ® Irgaclear ® XT 386$^g$ | 480 | 1803 | |
| Comp. ex. 27 | Ciba ® Irgaclear ® XT 386$^g$ | 330 | 1786 | |
| Ex. 15 | ADK Stab NA 71$^j$ | 150 | 1816 | 1759.5 |
| | Ciba ® Irgaclear ® XT 386$^g$ | 180 | | |
| Ex. 16 | ADK Stab NA 71$^j$ | 300 | 1818 | 1760.8 |
| | Ciba ® Irgaclear ® XT 386$^g$ | 180 | | |
| Ex. 17 | ADK Stab NA 21$^k$ | 300 | 1831 | 1746.9 |
| | Ciba ® Irgaclear ® XT 386$^g$ | 180 | | |

$^a$see table 8.
$^{g,j\ and\ k}$see table 5.
$^h$the calculated flexural (elastic) modulus of n ppm of a mixture of a % A and b % B = a % × "flexural (elastic) modulus of n ppm A" + b % × "flexural (elastic) modulus of n ppm B".

For example the calculated flexural (elastic) modulus of 330 ppm of a mixture of 45% ADK Stab NA 71 and 55% Ciba® Irgaclear® XT 386 (example 15)=45%×"flexural (elastic) modulus of 330 ppm ADK Stab NA 71"+55%× "flexural (elastic) modulus of 330 ppm Ciba® Irgaclear® XT 386"=45%×1727+55%×1786=1759.5.

As can be seen from table 9 polypropylene homopolymer compositions comprising 150 ppm ADK Stab NA 71 and 180 ppm Ciba® Irgaclear® XT 386 (example 15) show an improved (higher) flexural (elastic) modulus, namely 1816 MPa, compared with the polypropylene homopolymer compositions comprising 330 ppm ADK Stab NA 71 (flexural modulus=1727 MPa, comparative example 24) or 330 ppm Ciba® Irgaclear® XT 386 (flexural modulus=1786 MPa, comparative example 27). The effect is not of additive nature, but synergistic as can be seen when comparing the measured flexural (elastic) modulus (1816 MPa) with the calculated flexural (elastic) modulus (1759.5 MPa).

Table 9 shows the same effect regarding the flexural (elastic) modulus of the polypropylene homopolymer compositions comprising 150 ppm ADK Stab NA 71 and 180 ppm Ciba® Irgaclear® XT 386 (example 15), 300 ppm ADK Stab NA 71 and 180 ppm Ciba® Irgaclear® XT 386 (example 16), respectively, 300 ppm ADK Stab NA 21 and 180 ppm Ciba® Irgaclear® XT 386 (example 17).

Measurement of Haze

The pellets of examples 15 to 17, and comparative examples 23 to 27 are molded at 200° C. to plaques with a thickness of 2 mm using a standard injection molding machine (Arburg 320S).

The hazes the plaques are analysed using a Haze-gard plus instrument (BYK Gardner Gmbh Germany) in accordance with ASTM standard D1003. In this test, haze is commonly defined as that portion of visible light that is scattered at wider angles (2.5°<θ<90°) and is a measure for the turbidity of a sample.

The results are outlined in table 10.

TABLE 10

| Example No. | Nucleating agent | [ppm]$^a$ | Haze [%] | Calculated Haze$^i$ [%] |
|---|---|---|---|---|
| Comp. ex. 23 | ADK Stab NA 71$^j$ | 480 | 83.3 | — |
| Comp. ex. 24 | ADK Stab NA 71$^j$ | 330 | 86.5 | — |
| Comp. ex. 25 | ADK Stab NA 21$^k$ | 480 | 79.9 | — |
| Comp. ex. 26 | Ciba ® Irgaclear ® XT 386$^g$ | 480 | 85.5 | — |
| Comp. ex. 27 | Ciba ® Irgaclear ® XT 386$^g$ | 330 | 86.0 | — |
| Ex. 15 | ADK Stab NA 71$^j$ | 150 | 74.1 | 86.2 |
|  | Ciba ® Irgaclear ® XT 386$^g$ | 180 |  |  |
| Ex. 16 | ADK Stab NA 71$^j$ | 300 | 69.7 | 84.1 |
|  | Ciba ® Irgaclear ® XT 386$^g$ | 180 |  |  |
| Ex. 17 | ADK Stab NA 21$^k$ | 300 | 65.3 | 82.0 |
|  | Ciba ® Irgaclear ® XT 386$^g$ | 180 |  |  |

$^a$see table 8.
$^{g,j\ and\ k}$see table 5.
$^i$the calculated Haze of n ppm of a mixture of a % A and b % B = a % × "Haze of n ppm A" + b % × "Haze of n ppm B".

For example the calculated Haze of 330 ppm of a mixture of 45% ADK Stab NA 71 and 55% Ciba® Irgaclear® XT 386 (example 15)=45%×"Haze of 300 ADK Stab NA 71"+ 55%×"Haze of 300 ppm Ciba® Irgaclear® XT 386"=45%× 86.5+55%×86.0=86.2

As can be seen from table 10 polypropylene homopolymer compositions comprising 150 ppm ADK Stab NA 71 and 180 ppm Ciba® Irgaclear® XT 386 (example 15) show an improved (lower) haze, namely 74.1, compared with the polypropylene homopolymer compositions comprising 330 ppm ADK Stab NA 71 (haze=86.5, comparative example 24) or 330 ppm Ciba® Irgaclear® XT 386 (haze=86.0, comparative example 27). The effect is not of additive nature, but synergistic as can be seen when comparing the measured haze (74.1) with the calculated haze (86.2).

Table 10 shows the same effect regarding haze of the polypropylene homopolymer compositions comprising 150 ppm ADK Stab NA 71 and 180 ppm Ciba® Irgaclear® XT 386 (example 15), 300 ppm ADK Stab NA 71 and 180 ppm Ciba® Irgaclear® XT 386 (example 16), respectively, 300 ppm ADK Stab NA 21 and 180 ppm Ciba® Irgaclear® XT 386 (example 17).

Examples 18 to 21

The mixtures of nucleating agents as indicated in table 11 are mixed with dry powder form polypropylene (PP) random copolymer comprising 4 mole % ethylene (RD 204 CF from Borealis AG, Vienna, Austria) in a high speed mixer (Mixaco Lab CM 12). Under constant nitrogen purge, the mixture is then intensely melt-compounded at 240° C. for 3 minutes at 100 rpm screw speed using a co-rotating laboratory twin-screw extruder (15 cm$^3$ Micro-Compounder of DSM Xplore). The homogeneous melt is subsequently transferred to a 10 cm$^3$ Micro-Injector (DSM Xplore), where the melt is injected into a polished mold at a pressure of about 8 bars at 50° C. mold temperature. The resulting circular disks have a diameter of 40 mm and a thickness of 1.0 mm.

Measurement of Haze

The hazes the plaques are analysed using a Haze-gard plus instrument (BYK Gardner Gmbh Germany) at room temperature in accordance with ASTM standard D1003. All haze values are measured at least 24 hours after injection molding.

The results are outlined in table 11.

TABLE 11

| Example No. | Nucleating agent | [ppm]$^a$ | Haze [%] |
|---|---|---|---|
| Ex. 18 | Ciba ® Irgaclear ® XT 386$^g$ | 100 | 20.1 |
|  | ADK Stab NA 71$^j$ | 600 |  |
| Ex. 19 | Ciba ® Irgaclear ® XT 386$^g$ | 200 | 22.9 |
|  | ADK Stab NA 71$^j$ | 1200 |  |
| Ex. 20 | Ciba ® Irgaclear ® XT 386$^g$ | 100 | 19.6 |
|  | Precursor of ADK Stab NA 71$^l$ | 600 |  |
|  | lithium stearate | 360 |  |
| Ex. 21 | Ciba ® Irgaclear ® XT 386$^g$ | 200 | 16.7 |
|  | Precursor of ADK Stab NA 71$^l$ | 1200 |  |
|  | lithium stearate | 720 |  |

$^{a,\ g\ and\ j}$see table 5.
$^l$Precursor of ADK Stab NA 71 is

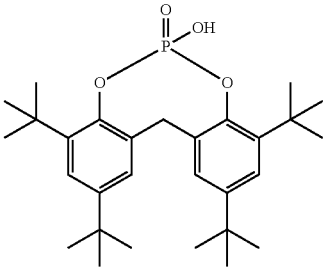 [SMILES: CC(C)(C)c1cc2c(c(C(C)(C)C)c1)OP(=O)(O)Oc1c(cc(C(C)(C)C)cc1C(C)(C)C)C2]

The invention claimed is:
1. A composition, comprising:
    (i) at least one polymer selected from the group consisting of polypropylene homopolymers
    (ii) 150 to 300 parts per million (ppm) of an organic compound A which is 1,3,5-tris-[2,2-dimethylpropionylamino]benzene, based on the weight of the polymer, and
    (iii) 150 to 300 parts per million (ppm) of at least one compound B selected from the group consisting of 1,3:2,4-bis(3,4-dimethylbenzylidene)sorbitol, a metal salt of 2,2'-methylene bis(4,6-di-tert-butylphenyl)phosphate, aluminium-hydroxy-bis[2,2'-methylene-bis(4,6-di-tert-butylphenyl)phosphate, and a zinc glycerolate, based on the weight of the polymer.
2. The composition of claim 1, wherein the compound B is 1,3:2,4-bis(3,4-dimethylbenzylidene)sorbitol.
3. The composition of claim 1, wherein the compound B is lithium 2,2'-methylene bis(4,6-di-tert-butylphenyl)phosphate.
4. The composition of claim 1, wherein the compound B is zinc glycerolate.
5. The composition of claim 1, having a haze of from 42.90% to 40.46%.
6. The composition of claim 1, wherein the compound B is aluminium-hydroxy-bis [2,2'-methylene-bis(4,6-di-tert-butylphenyl) phosphate.
7. A composition, comprising:
    (i) at least one polymer selected from the group consisting of polypropylene random copolymers containing 90 to 99.9 mol % propylene and 0.01 to 10 mol % ethylene as a comonomer, wherein the total amount of propylene and ethylene in the polymer is 100 wt %,
    (ii) 150 to 300 parts per million (ppm) of an organic compound A which is 1,3,5-tris-[2,2-dimethylpropionylamino]benzene, based on the weight of the polymer, and
    (iii) 150 to 300 parts per million (ppm) of at least one compound B selected from the group consisting of

1,3:2,4-bis(3,4-dimethylbenzylidene)sorbitol, a metal salt of 2,2'-methylene bis(4,6-di-tert-butylphenyl)phosphate, aluminium-hydroxy-bis[2,2'-methylene-bis(4,6-di-tert-butylphenyl)phosphate, and a zinc glycerolate, based on the weight of the polymer.

8. The composition of claim 7, wherein the compound B is 1,3:2,4-bis(3,4-dimethylbenzylidene)sorbitol.

9. The composition of claim 7, wherein the compound B is lithium 2,2'-methylene bis(4,6-di-tert-butylphenyl)phosphate.

10. The composition of claim 7, wherein the compound B is zinc glycerolate.

11. The composition of claim 7, wherein the compound B is aluminium-hydroxy-bis[2,2'-methylene-bis(4,6-di-tert-butylphenyl)phosphate.

* * * * *